United States Patent
Landesfeind et al.

(10) Patent No.: US 8,424,978 B2
(45) Date of Patent: Apr. 23, 2013

(54) METHOD FOR RELIABLY CLOSING A SOLENOID VALVE

(75) Inventors: Klaus Landesfeind, Backnang (DE); Christian Laier, Farmington Hills, MI (US); Carsten Bodmann, Ludwigsburg (DE); Ronny Goepfert, Oederan (DE); Manfred Maerz, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 804 days.

(21) Appl. No.: 12/095,078

(22) PCT Filed: Nov. 14, 2006

(86) PCT No.: PCT/EP2006/068412
§ 371 (c)(1),
(2), (4) Date: Jun. 19, 2009

(87) PCT Pub. No.: WO2007/060111
PCT Pub. Date: May 31, 2007

(65) Prior Publication Data
US 2009/0289494 A1    Nov. 26, 2009

(30) Foreign Application Priority Data

Nov. 25, 2005 (DE) .......................... 10 2005 056 210

(51) Int. Cl.
*B60T 8/36* (2006.01)
(52) U.S. Cl.
USPC ................... 303/119.2; 361/154; 251/129.15
(58) Field of Classification Search ............... 303/119.2, 303/119.1, 116.1; 251/129.15; 361/154
See application file for complete search history.

(56) References Cited

U.S. PATENT DOCUMENTS

| | | | |
|---|---|---|---|
| 5,645,097 A * | 7/1997 | Zechmann et al. ............... 137/1 |
| 5,823,640 A * | 10/1998 | Eichhorn et al. ............ 303/119.2 |
| 5,959,825 A * | 9/1999 | Harcombe .................... 361/154 |
| 6,019,441 A * | 2/2000 | Lloyd et al. ................... 303/156 |
| 6,276,610 B1 * | 8/2001 | Spoolstra .......................... 239/5 |
| 6,493,204 B1 * | 12/2002 | Glidden et al. ............... 361/187 |
| 6,504,699 B1 * | 1/2003 | Rader et al. .................... 361/155 |
| 6,830,201 B2 * | 12/2004 | Seelbach ......................... 239/88 |
| 7,150,410 B1 * | 12/2006 | Straub ............................... 239/5 |
| 2004/0183366 A1 * | 9/2004 | Kamiya et al. .................. 303/11 |

(Continued)

FOREIGN PATENT DOCUMENTS

DE   43 05 488   8/1994
DE   44 29 373   2/1996

(Continued)

OTHER PUBLICATIONS

International Search Report, PCT International Patent Application No. PCT/EP2006/068412, dated Mar. 1, 2007.

*Primary Examiner* — Robert A Siconolfi
*Assistant Examiner* — Mariano Sy
(74) *Attorney, Agent, or Firm* — Kenyon & Kenyon

(57) ABSTRACT

A method is for closing a solenoid valve in which the solenoid valve is charged with a first current value that results in a first closing of the solenoid valve, and the solenoid valve is subsequently charged with a second current value that results in a renewed partial opening of the solenoid valve, and the solenoid valve is subsequently charged with a third current value that results in a second closing of the solenoid valve, the third current value being selected such that the second closing takes place with a higher closing speed of the solenoid valve than does the first closing.

16 Claims, 3 Drawing Sheets

U.S. PATENT DOCUMENTS

| | | |
|---|---|---|
| 2005/0006951 A1* | 1/2005 | Schwarzer et al. ........ 303/119.2 |
| 2005/0017579 A1 | 1/2005 | Schmitt |

FOREIGN PATENT DOCUMENTS

| | | |
|---|---|---|
| DE | 101 04 497 | 8/2002 |
| DE | 101 44 879 | 9/2003 |
| JP | 58-214081 | 12/1983 |
| JP | 2-230702 | 9/1990 |
| JP | 11-243013 | 9/1999 |
| JP | 2001-146153 | 5/2001 |

* cited by examiner

METHOD FOR RELIABLY CLOSING A SOLENOID VALVE

FIELD OF THE INVENTION

The present invention relates to a method for the reliable closing of a solenoid valve.

BACKGROUND INFORMATION

German Published Patent Application No. 101 44 879 describes a method and a device for improving the pressure buildup dynamic in a brake circuit. The brake system described there is capable of carrying out braking interventions independent of the driver. For this purpose, a changeover valve is closed and a return pump is activated.

SUMMARY

Example embodiments of the present invention provide a method for closing a solenoid valve in which the solenoid valve is charged with a first current, or first current value, that results in a first closing of the solenoid valve, and the solenoid valve is subsequently charged with a second current, or second current value, that results in a new partial opening of the solenoid valve, and the solenoid valve is subsequently charged with a third current, or third current value, that results in a second closing of the solenoid valve.

The third current value is selected such that the second closing takes place with a higher closing speed of the solenoid valve than does the first closing.

Example embodiments of the present invention therefore includes a closing process of a solenoid valve that is made up of a first complete closing process and a second closing process in which the valve was previously opened only partially. The first closing process takes place more slowly than does the second closing process, and is therefore lower in noise. The second closing process takes place more strongly, but closes the valve in a completely leak-proof manner.

The charging of the solenoid valve with the second current value may have a time duration short enough that the solenoid valve is not completely opened. Due to this incomplete opening, the duration of the noisy second closing process is kept as short as possible. In addition, the very brief and only partial opening minimizes loss of the locked-in pressure.

The solenoid valve may be the changeover valve, situated between the main brake cylinder and the conveying side of the return pump, of a hydraulic brake circuit that can be used in the context of a wheel slippage controlling.

The charging of the solenoid valve with the first current value may take place when the driver brakes with sufficiently strong intensity. The closing of the valve thereby effected locks the braking pressure applied by the driver in the brake circuit, where it can for example be used to stop the vehicle or to prevent the vehicle from rolling away.

The charging of the solenoid valve with the second current value and with the third current value may not take place until the intensity of the driver braking has decreased. Because at this point in time the driver has already backed off of or released the brake pedal, the second closing process, which is stronger in its intensity, does not cause the driver to feel any irritating, comfort-reducing reaction on the braking pedal.

The closing of the changeover valve may lock the built-up braking pressure in the brake circuit.

The solenoid valve may be charged with the third current value immediately after the charging with the second current value. This keeps the second closing phase as temporally short as possible.

After the second closing the solenoid valve may be charged with a fourth current value that holds the solenoid valve closed.

According to example embodiments of the present invention:

the solenoid valve is a currentlessly open solenoid valve, the second current value is lower than the first current value, and the third current value is greater than the first current value.

In addition, example embodiments of the present invention provide a device for controlling a solenoid valve that is constructed such that:

the solenoid valve is charged with a first current value that results in a first closing of the solenoid valve, the solenoid valve is subsequently charged with a second current value that results in a renewed partial opening of the solenoid valve, the solenoid valve is subsequently charged with a third current value that results in a second closing of the solenoid valve, the third current value being selected such that the second closing takes place with a higher closing speed of the solenoid valve than does the first closing.

The advantageous constructions of the method are also expressed as advantageous constructions of the device, and vice versa.

The drawing includes FIGS. 1 to 4.

DETAILED DESCRIPTION

Electronic stability program systems include functions that require a braking or stopping of the vehicle when the brake is not actuated, through the locking of a pressure in the brake circuit. Here, the connection between the master brake cylinder, designated 112 in FIG. 1, and the inlet valves, designated EV, must be shut off by closing the changeover valves designated USV. Over the duration of a subsequent pressure holding phase, while the brake are not actuated the locked-in brake pressure is then present as a difference pressure via the changeover valve. A leakage that may occur at the changeover valve can result in a very rapid decrease in pressure in the brake circuit, then requiring a new buildup of pressure using the return pumps designated 110. This renewed pressure buildup is associated with noise, and thus with a reduction in comfort for the vehicle occupants.

Figure 1:
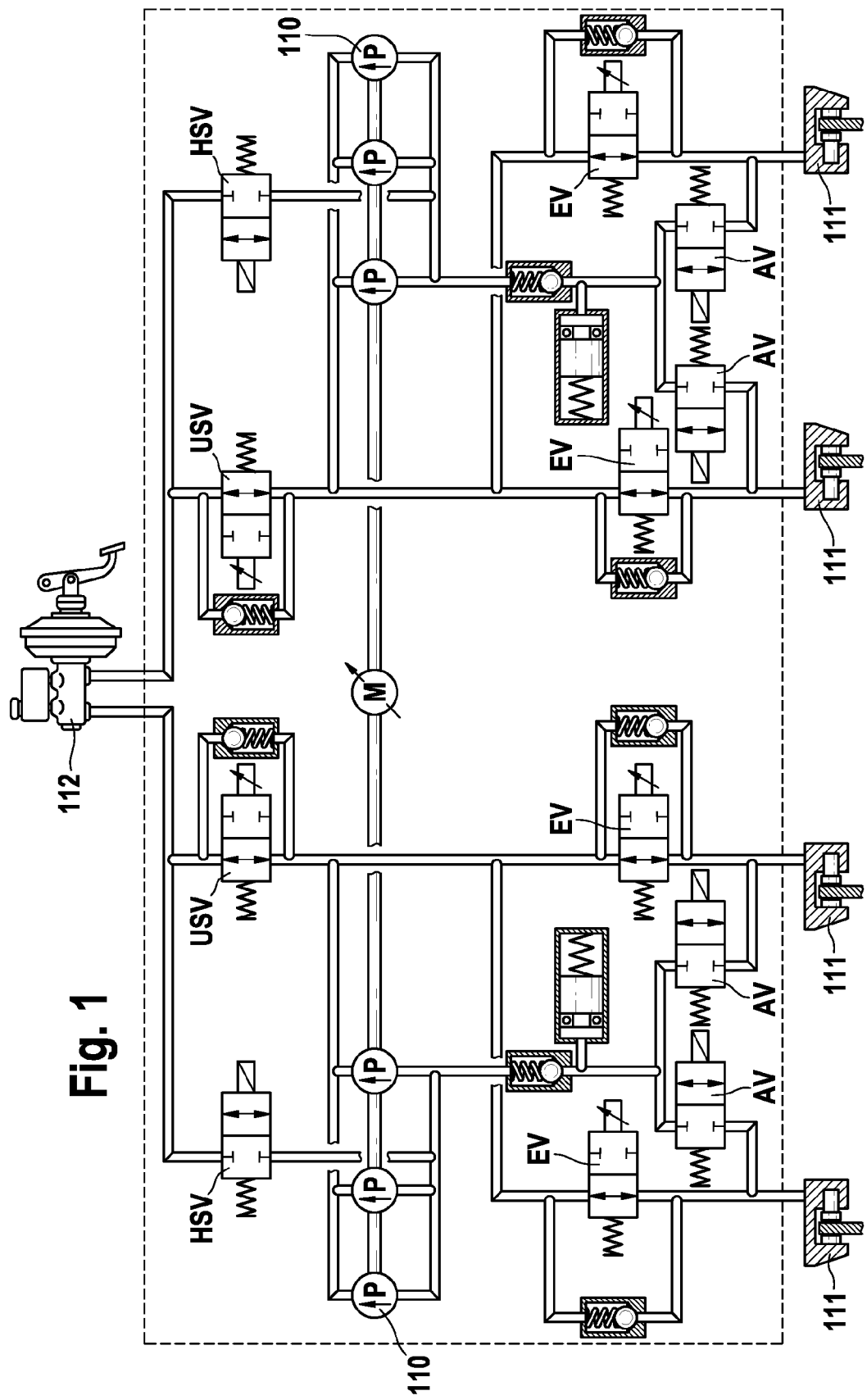
FIG. 1 shows the topology of a brake circuit that can be used in the context of a wheel slippage controlling such as e.g. ABS, ASR, or an electronic stability program system.

In FIG. 1, the wheel brake cylinders are designated 111, and AV designates the outlet valves.

The electronic controlling of the changeover valve during the closing process, i.e. the transition to the pressure holding phase, has an influence on the leakage tendency of the changeover valve. This leakage tendency can be suppressed by an optimal controlling of the changeover valve.

The cause of the tendency to leak is a remaining minimum residual opening of the changeover valve after the closing process. This can occur if the changeover valve closes very slowly, i.e., the valve tappet slides into the valve seat with a very low speed. Here, due to surface roughnesses of the valve tappet and the valve seat the valve tappet can get hung up and a slight residual opening can occur between the valve tappet and the valve seat. This residual opening causes a drop in pressure in the brake circuit.

Example embodiments of the present invention make it possible to move the valve tappet into the valve seat with a high speed, and thus with high kinetic energy. This takes place through a temporally very brief opening of the valve. In this way, the valve tappet obtains a stroke that can be used on the return path, i.e. when the valve is closed again, to accelerate the valve tappet.

Due to the brief opening of the USV in phase 3 (described below) and the volume flow connected therewith, there simultaneously takes place a flushing of the USV, in particular of the area of the seat. Accumulations of dirt that may be present in the seat area, caused for example by dirt particles contained in the brake fluid, are thus more effectively removed from the seat area. These accumulations of dirt can be a further cause of the incomplete closing of the USV in phase 3.

FIG. 2 shows, in the upper two diagrams designated a), the standard and conventional controlling of the changeover valve, and the two lower diagrams designated b) show the controlling of the changeover valve according to example embodiments of the present invention.

In both diagrams, time t is plotted on the abscissa, and in the respective upper diagram, the valve current I is plotted on the ordinate, and in the respective lower diagram the pre-pressure pvor and the wheel brake cylinder pressure p are plotted on the ordinate.

The abscissa direction is divided into four phases, which are explained in more detail below.

Phase 1:

In this phase, which extends from t=0 to t=t1, a driver-dependent pressure buildup in the brake circuit takes place through the actuation of the brake pedal. This can be seen in that the pre-pressure, and thus also the wheel brake cylinder pressure, increases over time. The changeover valve, open without current, is open due to the too-low current flow through the valve (I=0). In phase 1, the valve current can either be zero or else can have a value I0 that is not sufficient for the opening of the valve.

Phase 2:

This phase extends from t1 to t2. At time t1, the wheel brake cylinder pressure reaches a value that is to be maintained.

Figure 2A:
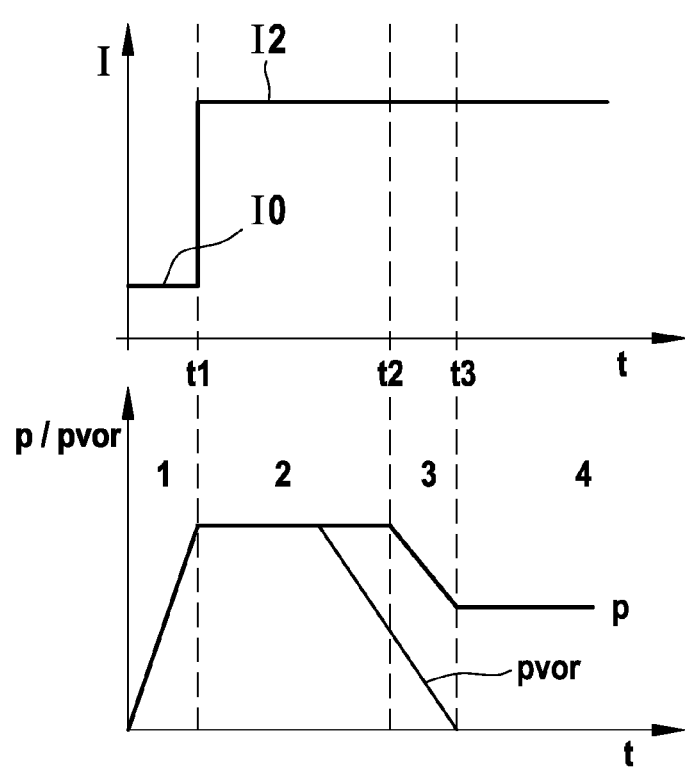
FIG. 2 shows various temporal curves of pressure and valve current in the case of a) conventional controlling and b) controlling according to example embodiments of the present invention of a solenoid valve.
Figure 2B:
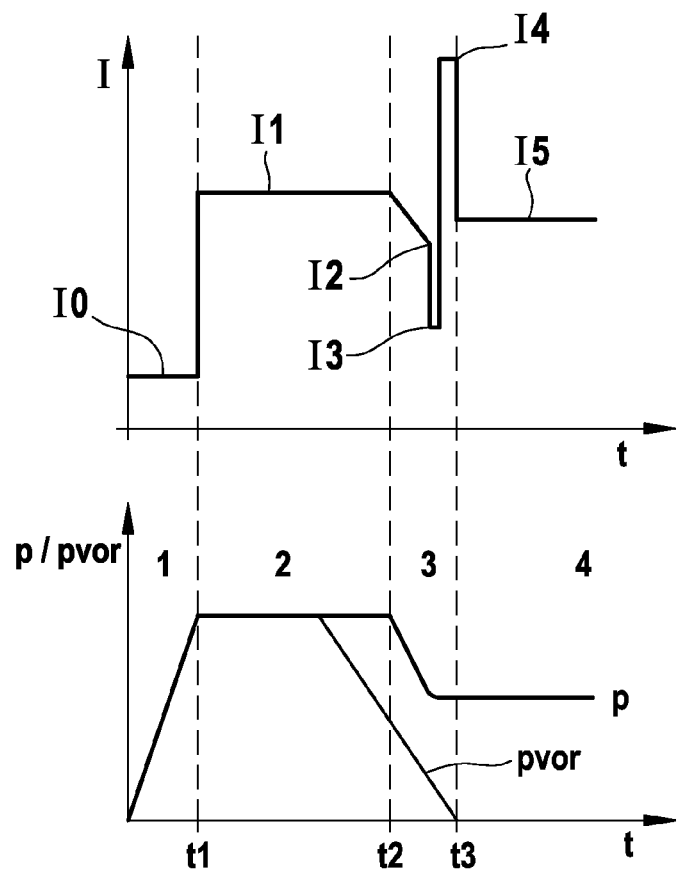

Therefore, the changeover valves are closed at this time, which can be seen by the jump from I=I0 to a pre-specified value I1 in FIG. 2*b*, or to I2 in FIG. 2*a*. During this phase, the pre-pressure pvor in the master brake cylinder is dismantled through the release of the brake pedal. However, the pressure p in the wheel brake cylinders remains constant, because the changeover valves are closed.

Phase 3:

This phase extends from t2 to t3. With the decrease in the pre-pressure that began already in phase 2, the pressure difference over the changeover valve increases until this valve opens at t2. In the controlling according to diagram a), this pressure dismantling takes place until the point at which the opening and closing forces in the valve are in equilibrium, i.e., the target pressure of phase 4 has been reached. In this case, the valve closes very slowly, i.e., the valve tappet slides into the valve seat with a speed close to zero, and there is therefore the danger that a small residual opening will remain between the valve seat and the tappet.

Because the same target pressure is to be achieved both in the conventional controlling according to FIG. 2*a* and in the controlling according to example embodiments of the present invention according to FIG. 2*b*, in the controlling according to FIG. 2*b* the current is lowered from the value I=I1 to the value I=I2 at the beginning of phase 3.

The optimized controlling according to diagram b) is characterized in that when the target pressure has been achieved, i.e. the opening and closing forces are in equilibrium, the valve is further opened by an almost jump-type lowering of the current to the value I3. Following this, the changeover valve is closed by a current pulse I4. This has the result that the valve tappet is moved into the seat with high speed and thus closes completely.

Phase 4:

In this phase, t>t3 is the pressure holding phase in which the brake pressure is locked in the brake circuit and is to be held constant. In the pressure holding phase, the changeover valve is controlled with current I5. I5 can be a higher current than is necessary for the closing of the valve, i.e. I5>I2. This provides a higher reserve of force for the closing force during the pressure holding phase.

Figure 3:
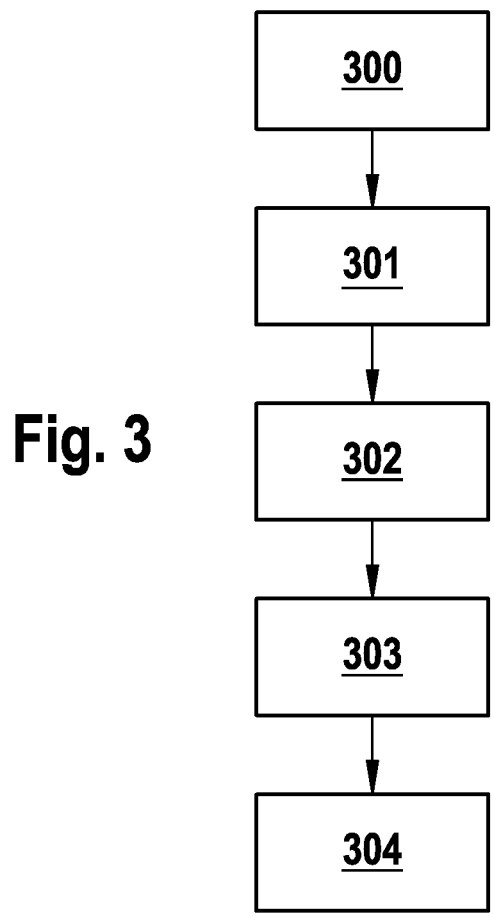
FIG. 3 shows the sequence of the method according to example embodiments of the present invention.

The sequence of the method according to example embodiments of the present invention is shown in FIG. 3. After the start of the method in block 300, in block 301 the solenoid valve is charged with a first current value that results in a first closing of the solenoid valve. Subsequently, in block 302 the solenoid valve is charged with a second current value that causes a new partial opening of the solenoid valve. Subsequently, in block 303 the solenoid valve is charged with a third current value that results in a second closing of the solenoid valve, the third current value being selected such that the second closing takes place with a higher closing speed of the solenoid valve than does the first closing. The method according to example embodiments of the present invention ends in block 304.

Figure 4:
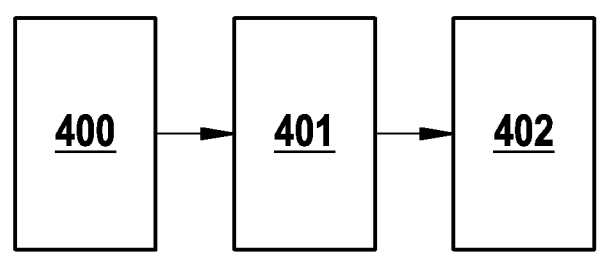
FIG. 4 shows the design of the device according to example embodiments of the present invention.

The design of the device according to example embodiments of the present invention is shown in FIG. 4. Here, block 400 designates sensor devices such as e.g. pressure sensors, whose output signals are supplied to control devices 401 which in turn control solenoid valve 402 according to example embodiments of the present invention.

What is claimed is:

1. A method for closing a solenoid valve, comprising:
charging the solenoid valve with a first current value that results in a first closing of the solenoid valve,
subsequently charging the solenoid valve with a second current value that results in a renewed partial opening of the solenoid valve; and
subsequently charging the solenoid valve with a third current value that results in a second closing of the solenoid valve;
subsequently charging the solenoid valve with a fourth current value that holds the solenoid valve closed;
wherein the third current value is selected such that the second closing takes place with a higher closing speed of the solenoid valve than does the first closing, and
wherein the current values are applied sequentially in a single cycle.

2. The method according to claim 1, wherein the charging of the solenoid valve with the second current value is brief enough that the solenoid valve is not completely opened.

3. The method according to claim 1, wherein the solenoid valve is a changeover valve, situated between a master brake cylinder and a conveying side of a return pump, of a hydraulic brake circuit that is adapted for use in the context of a wheel slippage controlling.

4. The method according to claim 3, wherein the charging of the solenoid valve with the first current value takes place in response to a braking action by a driver having sufficient intensity.

5. The method according to claim 4, wherein the charging of the solenoid valve with the second current value and with the third current value does not take place until the intensity of the driver braking action has already decreased again.

6. The method according to claim 5, wherein the closing of the changeover valve locks a built-up braking pressure in the brake circuit.

7. The method according to claim 1, wherein the solenoid valve is charged with the third current value immediately after being charged with the second current value.

8. The method according to claim 1,
wherein the solenoid valve is a currentlessly open solenoid valve;
wherein the second current value is less than the first current value; and
wherein the third current value is greater than the first current value.

9. A device for controlling a solenoid valve, comprising: control elements configured to:
charge the solenoid valve with a first current value that results in a first closing of the solenoid valve;
subsequently charge the solenoid valve with a second current value that results in a renewed partial opening of the solenoid valve;
subsequently charge the solenoid valve with a third current value that results in a second closing of the solenoid valve;
subsequently charge the solenoid valve with a fourth current value that holds the solenoid valve closed;
wherein the third current value is selected such that the second closing takes place with a higher closing speed of the solenoid valve than does the first closing, and
wherein the current values are applied sequentially in a single cycle.

10. The device according to claim 9, wherein the charging of the solenoid valve with the second current value is brief enough that the solenoid valve is not completely opened.

11. The device according to claim 9, wherein the solenoid valve is a changeover valve, situated between a master brake cylinder and a conveying side of a return pump, of a hydraulic brake circuit that is adapted for use in the context of a wheel slippage controlling.

12. The device according to claim 11, wherein the charging of the solenoid valve with the first current value takes place in response to a braking action by a driver having sufficient intensity.

13. The device according to claim 12, wherein the charging of the solenoid valve with the second current value and with the third current value does not take place until the intensity of the driver braking action has already decreased again.

14. The device according to claim 13, wherein the closing of the changeover valve locks a built-up braking pressure in the brake circuit.

15. The device according to claim 9, wherein the solenoid valve is charged with the third current value immediately after being charged with the second current value.

16. The device according to claim 9,
wherein the solenoid valve is a currentlessly open solenoid valve;
wherein the second current value is less than the first current value; and
wherein the third current value is greater than the first current value.

* * * * *

UNITED STATES PATENT AND TRADEMARK OFFICE
CERTIFICATE OF CORRECTION

PATENT NO. : 8,424,978 B2
APPLICATION NO. : 12/095078
DATED : April 23, 2013
INVENTOR(S) : Landesfeind et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1301 days.

Signed and Sealed this
Eighth Day of September, 2015

Michelle K. Lee
*Director of the United States Patent and Trademark Office*